(12) United States Patent
Müller

(10) Patent No.: US 6,626,484 B2
(45) Date of Patent: Sep. 30, 2003

(54) SLIDING COVER FOR MOTOR VEHICLES

(76) Inventor: Hermann-Frank Müller, Lyngsbergstr. 3a., D-53177 Bonn (DE)

( * ) Notice: Subject to any disclaimer, the term of this patent is extended or adjusted under 35 U.S.C. 154(b) by 0 days.

(21) Appl. No.: 10/061,401

(22) Filed: Feb. 1, 2002

(65) Prior Publication Data

US 2002/0105209 A1 Aug. 8, 2002

(30) Foreign Application Priority Data

Feb. 6, 2001 (DE) .......................... 101 05 564
Feb. 24, 2001 (DE) .......................... 101 09 074

(51) Int. Cl.⁷ ................................ B60J 7/04
(52) U.S. Cl. ...................................... 296/211
(58) Field of Search ................ 296/211; 136/244, 136/291, 245

(56) References Cited

U.S. PATENT DOCUMENTS 5,076,634 A * 12/1991 Muller et al. .............. 296/97.5
5,344,361 A * 9/1994 Matthias ..................... 454/129
6,046,401 A * 4/2000 McCabe ..................... 136/244
6,104,597 A * 8/2000 Konushi et al. ........... 361/301.4
6,410,843 B1 * 6/2002 Kishi et al. ................. 136/246

FOREIGN PATENT DOCUMENTS

DE 3713854 * 10/1987 ................. 296/211
JP 2001095166 * 4/2001
JP 2001135339 * 5/2001

* cited by examiner

Primary Examiner—Dennis H. Pedder
(74) Attorney, Agent, or Firm—Gudrun E. Huckett

(57) ABSTRACT

A sliding cover for a roof opening of a motor vehicle, closeable by a closing element, is movable in at least one direction parallel to the plane of the roof. The sliding cover has solar modules and a size surpassing at least in the direction of width of the sliding cover the size of the roof opening so that as many of the solar modules as possible can be attached to at least one side of the sliding cover. The sliding cover has at least one auxiliary electrical generator operating independently of an engine of the motor vehicle. Energy storing devices are provided to store the energy generated by the solar modules and the auxiliary electrical generators.

18 Claims, 6 Drawing Sheets

SLIDING COVER FOR MOTOR VEHICLES

BACKGROUND OF THE INVENTION

1. Field of the Invention

The invention relates to a sliding cover of elastic strong material, in particular, for a roof opening closeable by a closing element (sliding roof), wherein the sliding cover is movable in at least one plane that is parallel to the plane of the roof.

2. Description of the Related Art

A sliding cover of the aforementioned kind is known from German patent 199 07 333 C1, for example. In this connection—independent of the special configuration of the closing element and/or of the vehicle roof, for example, of a lamella arrangement or folding arrangement—the sliding cover can be comprised of several shortened sliding cover parts which can be moved in two directions, respectively, and can also be of a lamella arrangement or a folding arrangement.

German patent application 101 03 693 discloses a sliding roof with a roof opening that can be closed by a closing element. For enhancing the generation of electrical energy, at least one auxiliary electrical generator of a special configuration is provided on the sliding roof in addition to the solar modules provided on the sliding roof or on its closing element. Such auxiliary electrical generator operates independently of the vehicle engine.

SUMMARY OF THE INVENTION

It is an object of the present invention to further develop the configuration of the aforementioned kind in order to improve the output of electrical energy even more.

In accordance with the present invention, this is achieved in that the sliding cover is integrated into the system for generating electrical energy, wherein the dimensions of the sliding cover surpass those of the roof opening of the vehicle, at least in the direction of width in order to be able to arrange as many solar modules as possible on at least one side of the sliding cover. Moreover, on the sliding cover at least one auxiliary electrical generator (generator for generating electrical energy) of a special configuration is provided which operates independently of the vehicle engine.

DESCRIPTION OF THE PREFERRED EMBODIMENTS

Figure 1:
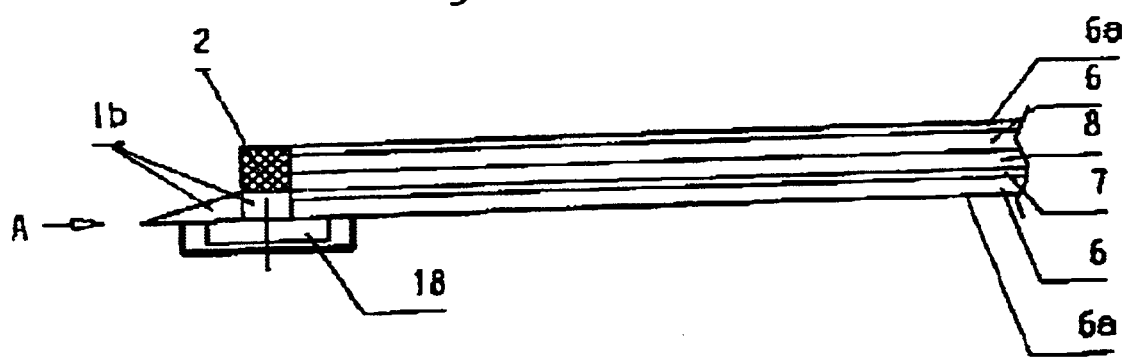
FIG. 1 is a cross-sectional view of the sliding cover according to the invention.
Figure 1A:
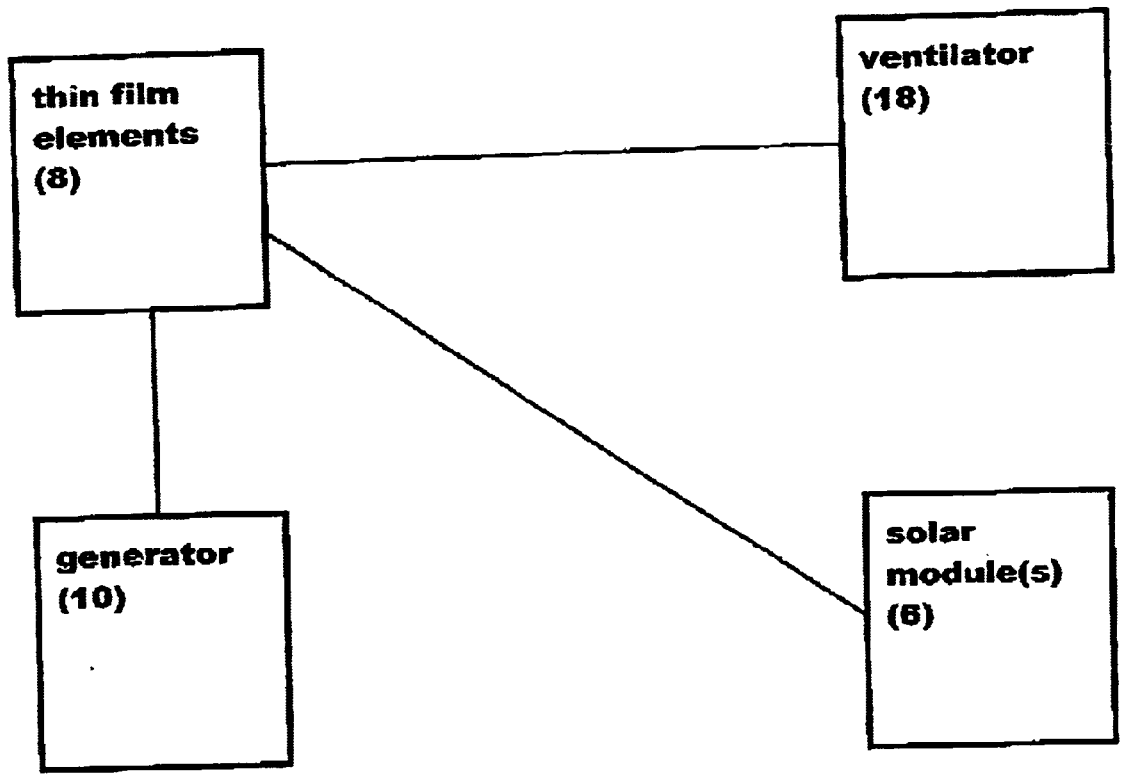
FIG. 1a is a schematic illustration of the connections between the energy storage, generator, solar modules, and the ventilator.
Figure 2:
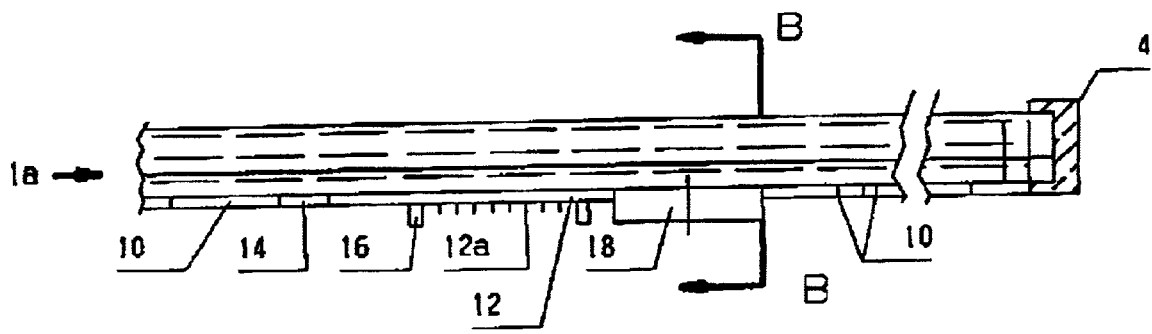
FIG. 2 is a view of the sliding cover in the direction A according to FIG. 1.
Figure 3:
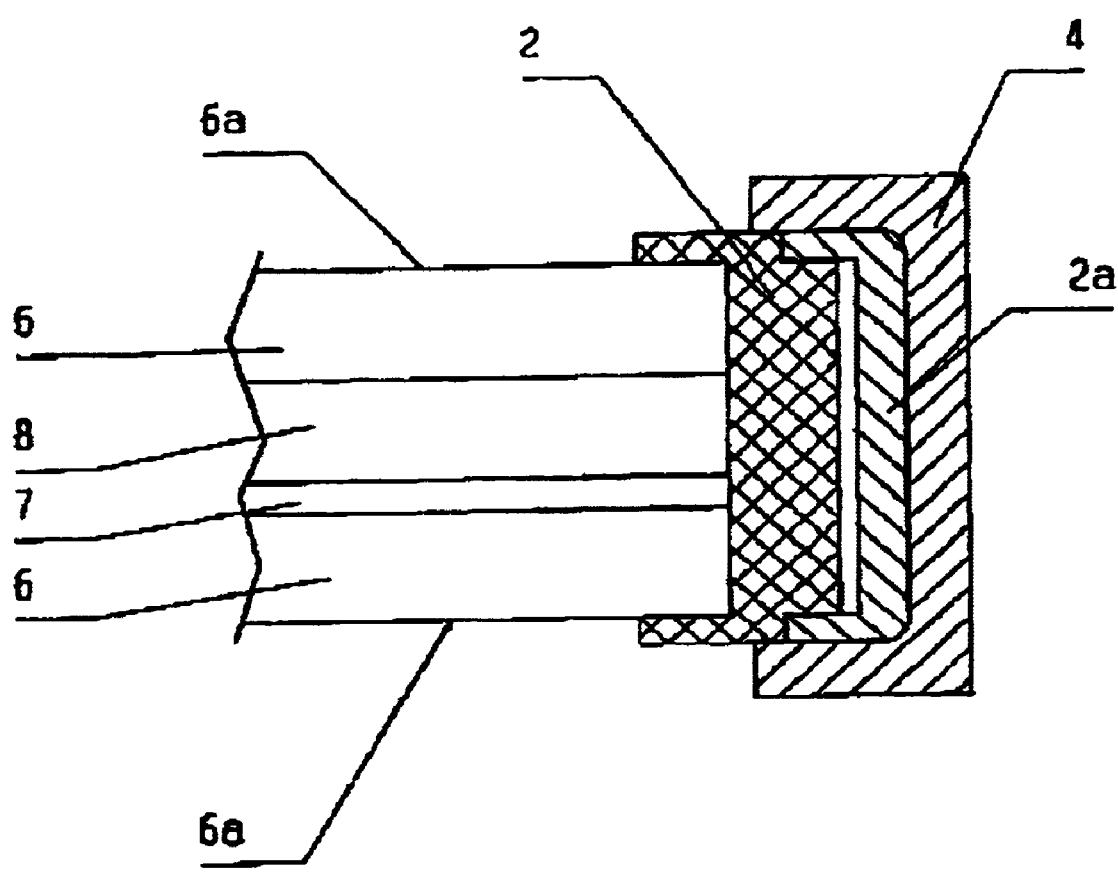
FIG. 3 is a cross-section of the sliding cover guide arrangement.

The sliding cover 1 according to FIGS. 1 and 2 is comprised of an elastic strong support material 7, for example, a fabric, cloth or foil or the like, on which solar modules 6 and correlated energy storage devices 8 are arranged and which is surrounded circumferentially by a frame 2 of elastic material, such as rubber or the like. The frame 2 glides in stationary guides 4. For improving gliding within the guides 4, the frame 2 is optionally covered by a plastic coating 2a or sections of a plastic coating (in the case of a rollable sliding cover) in the area where it contacts the guides 4; this is illustrated in FIG. 3. Depending on the initial collapsed or folded position of the sliding cover 1, for example, in the form of several slidingly stacked individual sections (see German patent document 199 70 333 C1) forming a stack, pushed together in a lamellar arrangement, or rolled onto a roll (similar to the arrangement disclosed in German patent application 198 50 296 A1), the stationary guide arrangement formed by the guides 4 of the frame 2 of the sliding cover 1 is configured such that the frame 2 can glide without difficulty into the receptacles of the guides from its initial position. In this connection, the special configuration of the sliding cover 1 and its frame 2 must be taken into account since, for example, in the case of a stack of folded individual sections or a pushed-together lamella arrangement, these individual stacked sections or lamella sections of the sliding cover 1 are articulated to one another and the articulations must be received easily and safely by the stationary guide arrangement 4.

Of course, the material selected for the sliding cover 1 also plays an important role. When the solar modules 6 are light-transmissive (transparent) and configured and arranged such that they can generate electrical energy on both areal sides (opposed large surfaces), but are not very elastic or are covered by glass as a protective cover against the environment, then it is possible to form a stacked arrangement of the individual sections of the sliding cover 1 or to push them together in an lamella arrangement, but they cannot be rolled onto a roll. When the solar modules 6, on the other hand, are of a thin-film configuration, their elasticity is sufficient for the purpose of rolling them onto a roll. The solar modules 6 can be comprised for this purpose, for example, of monocrystalline and/or polycrystalline solar cells, in particular, thin-film photovoltaic (PV) elements, for example, made of thin-film amorphous silicon, copper-indium-diselenide, cadmium telluride, gallium arsenide, crystalline silicon.

Another possibility of providing solar cells is to apply a coating on the support material 7. This can be realized, for example, in the case of CIS thin films (copper-indium-selenium) by means of an ion beam (see German patent application 199 02 908 A1). This process can be applied to glass substrates as well as flexible and light-weight substrates such as metal-coated plastic foils or a fabric.

Solar modules 6 of a thin film configuration as well as energy-storing devices 8 of a thin film configuration, in the form of accumulators (batteries) or high-performance capacitors, are capable of forming the actual sliding cover 1, especially when positioned in a layered arrangement, without this necessitating an additional support of fabric 7. They form a self-supporting material of the sliding cover 1. In FIGS. 1 to 3, a support layer (7) is illustrated.

When it is desired to allow ventilation between the interior of the vehicle and the environment of the vehicle in a situation where the vehicle roof is open by having moved the sliding roof (closure element of the roof opening) into the open position to the side but still having the sliding cover 1 covering the opening of the vehicle roof, the sliding cover 1 not only must be comprised of an air-permeable support material 7 but also must have aligned openings in the individual layers of the sliding cover 1 comprising the solar modules 6 and the energy-storing thin-film elements or devices 8. These aligned openings can be provided, for example, in the area of the sliding cover 1 where the individual sections of the sliding cover 1 are articulated. As an alternative, the usually stationary guides 4 for the frame 2 of the sliding cover 1 can be lowered in the sliding direction so that a corresponding slot opening is provided relative to the vehicle roof.

In order to improve the generation of electrical energy in the area of the sliding cover 1, the one or more auxiliary electrical generators 10 of a special configuration are provided primarily on the end face or leading end 1a of the sliding cover 1. These generators 10 are not actuated by the vehicle engine. The special configuration refers to generators including, for example, hydrogen-operated strip-shaped polymer electrolyte fuel cells (PEFC) and direct methanol fuel cells (DMFC). These generators 10 are preferably provided in housings with a snap-on cover. The housing, if desired, can also be lockable in order to prevent unauthorized access. Each hydrogen-operated fuel cell of a generator has correlated therewith at least one, preferably several hydrogen cartridges. In this connection it is advantageous when several hydrogen cartridges can be positioned in the housing which, similar to the action of a repeating rifle, can be moved sequentially in a controlled fashion to the fuel cell. The electrical energy which is generated in this way can be stored in adjacently arranged energy-storing thin-film elements 8 or can be supplied directly to a consumer.

It is within the capabilities of a person skilled in the art to decide whether these generators 10 should be arranged only on the end face 1a of the sliding cover 1 or additionally in parallel rows since this has a corresponding effect on the return of the sliding cover 1 into its initial (folded or stored) position. The arrangement of additional generators 10 on the underside of the guide rails 4 would have no effect on the return movement of the sliding cover 1, but it is then necessary to provide an electrical connection which is protected against touch relative to the energy-storing thin-film elements 8 of the sliding cover 1.

On the end face 1a of the sliding cover 1 or in the downwardly facing area of the sliding cover 1 adjoining the end, a component 12, for example, of flexible thin glass with a keypad 12a is provided and is used for actuation of the sliding cover 1 as needed; for a possible lowering in the sliding direction; for actuation of the electrical generators 10 of a special configuration, optionally controlled according to number, timing, and duration; for switching on LEDs 16 (in particular, OLEDs and/or PLEDS) for the purpose of illuminating the keypad 12 itself and LEDS within the sliding cover 1 for illuminating the interior of the vehicle; and for activating the connection from the energy-storing thin-film elements 8 to a plug 14 also provided on the component 12 for supplying other electrical consumers, for example, air conditioning system and ventilators of the vehicle or the like.

Of course, there is the possibility to adapt the design of the sliding cover 1 according to the color specifications desired by of the buyer of the vehicle. This is also true in the situation where the side of the sliding cover 1 facing the interior of the vehicle is formed of solar modules 6.

On the end face 1a of the sliding cover 1 a ventilator 18 can be arranged. This location is preferred because here the sliding cover 1—also for the purpose of improved gliding of the sliding cover 1 into the stationary guides 4—has a slanted strip 1b which can easily be formed such that it is able to support the weight of the ventilator 18. In this connection, it is also conceivable that the ventilator 18 is threaded like a light bulb with a corresponding socket into the strip 1 only when needed or to arrange the at least one ventilator 18 on connecting strips extending between the stationary guides 4 for the sliding cover 1; it is then again required to provide an electrical connection to the energy-storing thin film elements 8 in the sliding cover which is protected against touch.

Figure 4:
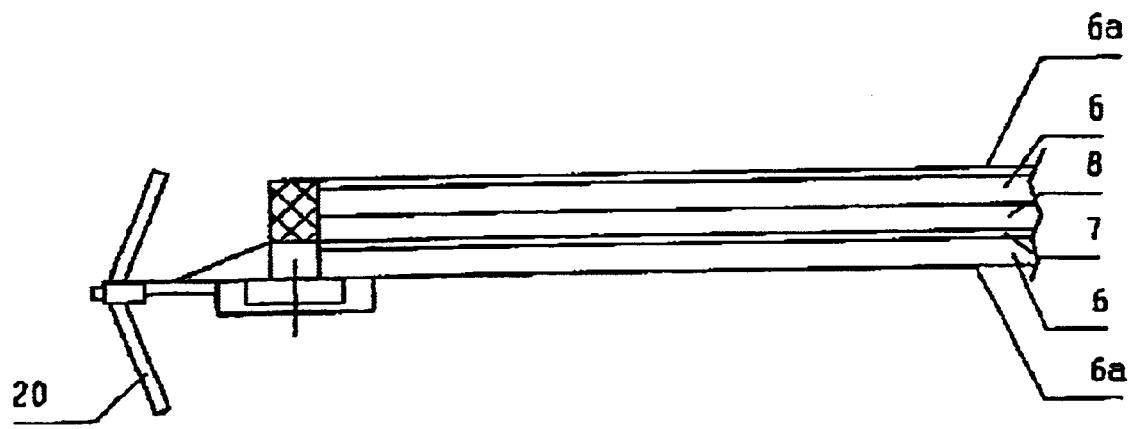
FIG. 4 shows the arrangement of a reflector on the sliding cover.
Figure 5:
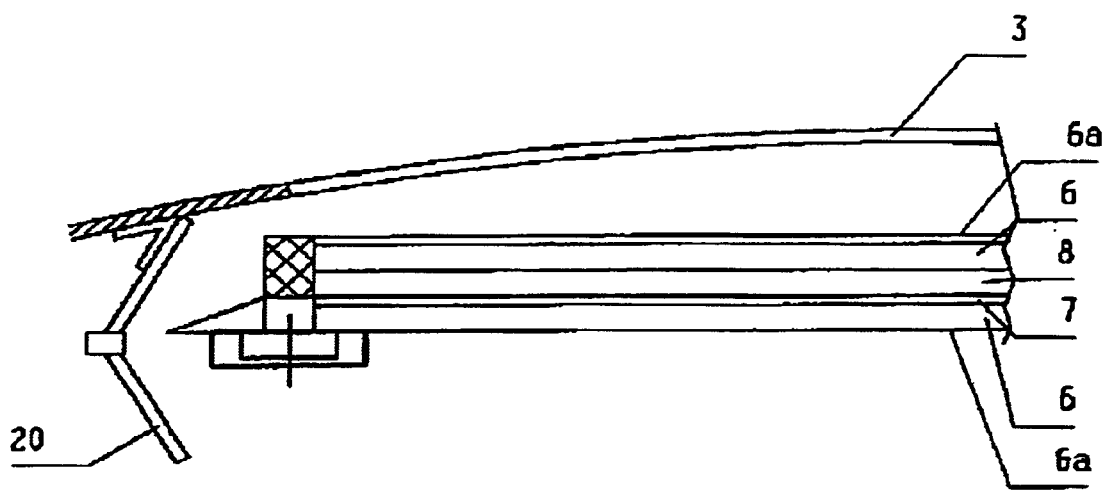
FIG. 5 shows the arrangement of a reflector on the opening of the vehicle roof.

In order to be able to transport more light from the exterior to the solar modules 6 facing the interior of the vehicle and in order to improve in this way their efficiency, it is possible to provide reflectors 20 which can have a fixed spacing or a variable spacing, realized by means of constructively known mechanical, electrical, hydraulic or pneumatical devices, from the end face 1a of the sliding cover 1 on the sliding cover itself or on the roof opening 3 of the vehicle. This is disclosed and illustrated in FIGS. 4 and 5. These reflectors are, of course, also adjustable such that, if needed, the light as well as the air supply through the roof opening 3 can be closed off.

For use of the sliding cover 1 external to the vehicle, for example, when camping, a separable locking mechanism can be provided, as suggested in German patent document 40 03 399 C2. In this connection, the stationary guides 4 for the sliding cover 1 as well as the, for example, plate-shaped support for the stacked or slidably folded sliding cover sections or the roll for the rollable sliding cover can be locked or snapped into place within the vehicle roof.

The sliding cover according to the invention can be used in connection with any type of vehicle such as a passenger car, a truck, van, bus or the like but also in connection with railroad cars, ships, airplanes as well as mobile homes, with appropriate modifications, if needed.

While specific embodiments of the invention have been shown and described in detail to illustrate the inventive principles, it will be understood that the invention may be embodied otherwise without departing from such principles.

What is claimed is:

1. A sliding cover (1) for a roof opening of a motor vehicle closeable by a closing element, wherein the sliding cover (1) is movable in at least one direction parallel to the plane of the roof, wherein the sliding cover (1) comprises solar modules (6) attached to at least one side of the sliding cover (1), and wherein the sliding cover (1) comprises at least one auxiliary electrical generator (10) operating independently of an engine of the motor vehicle;

wherein a component (12) of flexible thin glass is provided on one end face (1a) of the sliding cover (1) and wherein the component (12) has a keypad (12a).

2. A sliding cover according to claim 1, wherein the at least one electrical generator (10) is a hydrogen-operated strip-shaped polymer electrolyte fuel cell.

3. A sliding cover according to claim 1, wherein the at least one generator (10) is a direct methanol fuel cell (DMFC).

4. A sliding cover according to claim 1, wherein the at least one generator (10) is mounted on the leading end (1a) of the sliding cover (1).

5. A sliding cover according to claim 1, comprising light reflectors (20) mounted at a fixed spacing or adjustable spacing from a leading end (1a) of the sliding cover (1) on the roof opening (3).

6. A sliding cover according to claim 1, comprising at least one energy-storing thin-film element (8) connected to the solar modules (6) and the at least one electrical generator (10).

7. The sliding cover according to claim 6, wherein the at least one energy-storing thin-film element (8) is selected from the group consisting of an accumulator and a high-performance capacitor.

8. A sliding cover according to claim 1, comprising a support material (7), wherein the solar modules (6) are formed as a transparent thin film on the support material (7) and have two opposed surfaces and the two opposed surfaces generate electrical energy.

9. A sliding cover according to claim 1, further comprising energy-storing thin-film elements (8), wherein the solar modules (6) form two light-transparent thin films, wherein the energy-storing thin-film elements (8) are positioned as an intermediate layer between the two light-transparent thin films of the solar modules (6) and are connected to the solar modules (6) and the at least one electrical generator (10).

10. A sliding cover according to claim 1, wherein the solar modules (6) have two opposed surfaces and the two opposed surfaces generate electrical energy.

11. A sliding cover according to claim 1, wherein the solar modules (6) have a light-transparent, moisture-repellent and dirt-repellent protective layer (6a).

12. A sliding cover according to claim 1, wherein at least some of the solar modules (6) form a layer facing the interior of the vehicle and wherein the layer is provided with LEDs (16).

13. A sliding cover according to claim 1, comprising LEDs (16) mounted in the component (12).

14. A sliding cover according to claim 1, comprising a frame (2) of elastic material configured to glide in stationary guides (4).

15. A sliding cover according to claim 1, comprising at least one ventilator (18) arranged at a leading end (1a) of the sliding cover (1), wherein the sliding cover comprises at least one energy-storing device (8) connected to the solar modules (6) and the at least one auxiliary electrical generator (10), wherein the at least one ventilator (18) is connected to the at least one energy-storing device (8).

16. A sliding cover (1) for a roof opening of a motor vehicle closeable by a closing element, wherein the sliding cover (1) is movable in at least one direction parallel to the plane of the roof, wherein the sliding cover (1) comprises solar modules (6) attached to at least one side of the sliding cover (1), and wherein the sliding cover (1) comprises at least one auxiliary electrical generator (10) operating independently of an engine of the motor vehicle;

at least one ventilator (18) arranged at a leading end (1a) of the sliding cover (1), wherein the sliding cover comprises at least one energy-storing device (8) connected to the solar modules (6) and the at least one auxiliary electrical generator (10), wherein the at least one ventilator (18) is connected to the at least one energy-storing device (8);

wherein the leading end (1a) has a slanted strip (1b) on which the ventilator (18) is fastened.

17. A sliding cover according to claim 1, comprising light reflectors (20) mounted at a fixed spacing or adjustable spacing from a leading end (1a) of the sliding cover (1) on the sliding cover (10).

18. A sliding cover according to claim 1, wherein the sliding cover (1) is detachable for use of the sliding cover (1) outside of the vehicle.

* * * * *